(12) United States Patent
Rath et al.

(10) Patent No.: US 11,378,469 B2
(45) Date of Patent: Jul. 5, 2022

(54) METHOD AND APPARATUS FOR IDENTIFYING A FORCE EXERTED BY A SEAT OR CLOSING PART

(71) Applicant: Continental Automotive GmbH, Hannover (DE)

(72) Inventors: Stefan Rath, Vienna (AT); Andreas Egger, Groß-Enzersdorf (AT); Stefan Holzmann, Gaweinstal (AT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 858 days.

(21) Appl. No.: 16/311,243

(22) PCT Filed: Jun. 27, 2017

(86) PCT No.: PCT/EP2017/065893
§ 371 (c)(1),
(2) Date: Dec. 19, 2018

(87) PCT Pub. No.: WO2018/002075
PCT Pub. Date: Jan. 4, 2018

(65) Prior Publication Data
US 2020/0309610 A1 Oct. 1, 2020

(30) Foreign Application Priority Data
Jul. 1, 2016 (DE) ...................... 10 2016 212 046.8

(51) Int. Cl.
*G01L 1/00* (2006.01)
*B60N 2/02* (2006.01)
*H02H 7/085* (2006.01)

(52) U.S. Cl.
CPC ............ *G01L 1/005* (2013.01); *B60N 2/0232* (2013.01); *H02H 7/0851* (2013.01); *B60N 2002/0272* (2013.01)

(58) Field of Classification Search
CPC .... G01L 1/005; H02H 7/0851; B60N 2/0232; B60N 2002/0272
(Continued)

(56) References Cited

U.S. PATENT DOCUMENTS 4,220,900 A * 9/1980 Mintz .................... H02H 3/087
                                                318/266
4,641,067 A * 2/1987 Iizawa ...................... H02P 7/03
                                                318/280
(Continued)

FOREIGN PATENT DOCUMENTS

DE   19504032 A1   11/1995
DE   10048601 A1   4/2002
(Continued)

OTHER PUBLICATIONS

International Search Report and Written Opinion for International Application No. PCT/EP2017/065893, dated Oct. 27, 2017, 8 pages.
(Continued)

*Primary Examiner* — Mark R Wendell
(74) *Attorney, Agent, or Firm* — RatnerPrestia

(57) ABSTRACT

A method and an apparatus for identifying a force and/or torque exerted by a part, in particular a seat or closing part, such as, a window winding system or sunroof or trunk lid or sliding door of a motor vehicle, that can be electrically adjusted by way of an electric motor on a body resting on said part, having an actuation system, which is configured to apply a voltage to the motor, which voltage causes a force of the part on a body, if present, resting on the part, having a measurement device, which is configured, while the motor is stationary, to measure a variable of the motor representing a movement of the motor, having a comparison device,
(Continued)

which is configured to identify, based on the measured variable, a force that is exerted by the part on a body resting on the part.

18 Claims, 5 Drawing Sheets

(58) Field of Classification Search
USPC .......................................................... 73/763
See application file for complete search history.

(56) References Cited

U.S. PATENT DOCUMENTS

| | | | | |
|---|---|---|---|---|
| 5,422,551 | A * | 6/1995 | Takeda | H02H 7/0851 318/265 |
| 5,585,705 | A * | 12/1996 | Brieden | B60J 7/0573 318/266 |
| 5,668,451 | A * | 9/1997 | Driendl | G05B 19/4062 318/466 |
| 5,734,244 | A * | 3/1998 | Lill | B60J 7/0573 318/452 |
| 5,770,934 | A | 6/1998 | Theile | |
| 5,801,501 | A * | 9/1998 | Redelberger | F16H 1/16 318/283 |
| 5,977,732 | A * | 11/1999 | Matsumoto | H02H 7/0851 318/283 |
| 6,051,945 | A * | 4/2000 | Furukawa | H02H 7/0851 318/264 |
| 6,150,785 | A * | 11/2000 | Butscher | H02H 7/0851 318/282 |
| 6,952,087 | B2 | 10/2005 | Lamm | |
| 7,021,001 | B1 * | 4/2006 | Schooler | E05F 15/41 318/282 |
| 7,205,735 | B2 * | 4/2007 | Keller | E05F 15/40 318/266 |
| 7,305,290 | B2 | 12/2007 | Russ et al. | |
| 7,610,030 | B2 * | 10/2009 | Fitzgibbon | G08C 17/00 340/12.22 |
| 7,615,944 | B2 * | 11/2009 | Ubelein | E05F 15/41 318/266 |
| 7,633,258 | B2 * | 12/2009 | Huber | A47B 88/463 318/646 |
| 7,786,689 | B2 | 8/2010 | Rösch | |
| 7,791,299 | B2 * | 9/2010 | Eichin | E05F 15/695 318/469 |
| 7,812,492 | B2 * | 10/2010 | Torres | H02K 11/215 310/89 |
| 8,198,849 | B2 * | 6/2012 | Lamm | H02H 7/0851 318/476 |
| 8,493,081 | B2 * | 7/2013 | Bolbocianu | E05F 15/443 324/691 |
| 8,541,969 | B2 | 9/2013 | Holzinger et al. | |
| 9,234,979 | B2 * | 1/2016 | Bolbocianu | B60J 5/107 |
| 9,239,579 | B2 * | 1/2016 | Schlesiger | G05B 24/02 |
| 9,287,821 | B2 | 3/2016 | Fukuoka et al. | |
| 10,030,432 | B1 * | 7/2018 | Heirtzler, Jr. | E05F 15/77 |
| 2002/0190679 | A1 * | 12/2002 | Lamm | E05F 15/41 318/443 |

FOREIGN PATENT DOCUMENTS

| | | |
|---|---|---|
| DE | 102005000753 A1 | 8/2005 |
| DE | 202006002527 U1 | 6/2007 |
| DE | 102009008369 A1 | 8/2010 |
| DE | 102009035449 B3 | 2/2011 |
| DE | 102009044912 A1 | 4/2011 |
| DE | 102013002245 A1 | 8/2013 |

OTHER PUBLICATIONS

Vierquadrantensteller (Four Quadrant), http://de.wikipedia.org/wiki/vierquadrantensteller, with English translation, 14 pages.

German Examination Report for German Application No. 10 2016 212 046.8, dated May 26, 2017, with partial English translation, 8 pages.

* cited by examiner

METHOD AND APPARATUS FOR IDENTIFYING A FORCE EXERTED BY A SEAT OR CLOSING PART

CROSS REFERENCE TO RELATED APPLICATIONS

This application is the U.S. National Phase Application of PCT International Application No. PCT/EP2017/065893, filed Jun. 27, 2017, which claims priority to German Patent Application No. 10 2016 212 046.8, filed Jul. 1, 2016, the contents of such applications being incorporated by reference herein.

FIELD OF THE INVENTION

The invention relates to a method and an apparatus for identifying a force exerted by a part (in particular a seat or closing part, such as, in particular, a window winding system or a sunroof or a trunk lid or a sliding door of a motor vehicle) that can be electrically adjusted by way of an electric motor on a body that may be resting on said part.

BACKGROUND OF THE INVENTION

DE 10 2009 008 369 A1, DE 10 2009 035 449 B3 and DE 10 2005 000753 A1, which are incorporated by reference, each describe methods for identifying jamming of a moved closing part.

SUMMARY OF THE INVENTION

An aspect of the invention aims to optimize identification of a force on a part, such as, in particular, a closing part or a seat. As alternatives to present solutions, refinements of aspects of the invention can make it possible to identify a force on a part such as, in particular, a closing part or a seat, effectively in an alternative manner.

Refinements of aspects of the invention solve the problem of the identification of the force acting on a movable part, in particular a closing part or seat, when the part is stationary (or virtually stationary). The part is operated here, for example, by way of a DC motor.

With respect to some configurations of aspects of the invention:

according to refinements of aspects of the invention, in particular for pretension of the moved part (in particular closing part or seat) and/or of the motor, a voltage whose magnitude is below a prescribed motor voltage threshold value (before a variable representing the movement of the motor, such as, for example, a voltage or a current or an angle encoder value, is measured or calculated or estimated, for example, by way of the measurement device during freewheeling of the motor) is applied to the motor, in particular a voltage whose magnitude is below a prescribed motor voltage threshold value that would be necessary in order to cause the part to move.

According to refinements of aspects of the invention, the actuation system can be, for example, a reliable full-bridge having electronically actuatable switching elements such as, for example, field-effect transistors, which full-bridge is configured to switch the motor switched thereby to freewheeling and/or high impedance and/or for exerting a force (driving in the opposite direction and/or in the direction of a body) on the part. According to refinements of aspects of the invention, the actuation system can also use, for example, a pulse-width-modulation device, in order to switch the motor switched thereby to freewheeling and/or high impedance and/or to a lower voltage or to a voltage for movement/rotational movement of the part in a direction different to that executed most recently.

BRIEF DESCRIPTION OF THE DRAWINGS

Further features and advantages of some advantageous refinements of aspects of the invention will emerge from the following description of some exemplary embodiments of the invention with reference to the drawing, in which, to illustrate some possible refinements of the invention, in a schematically simplifying manner.

DETAILED DESCRIPTION OF THE PREFERRED EMBODIMENTS

Figure 1:
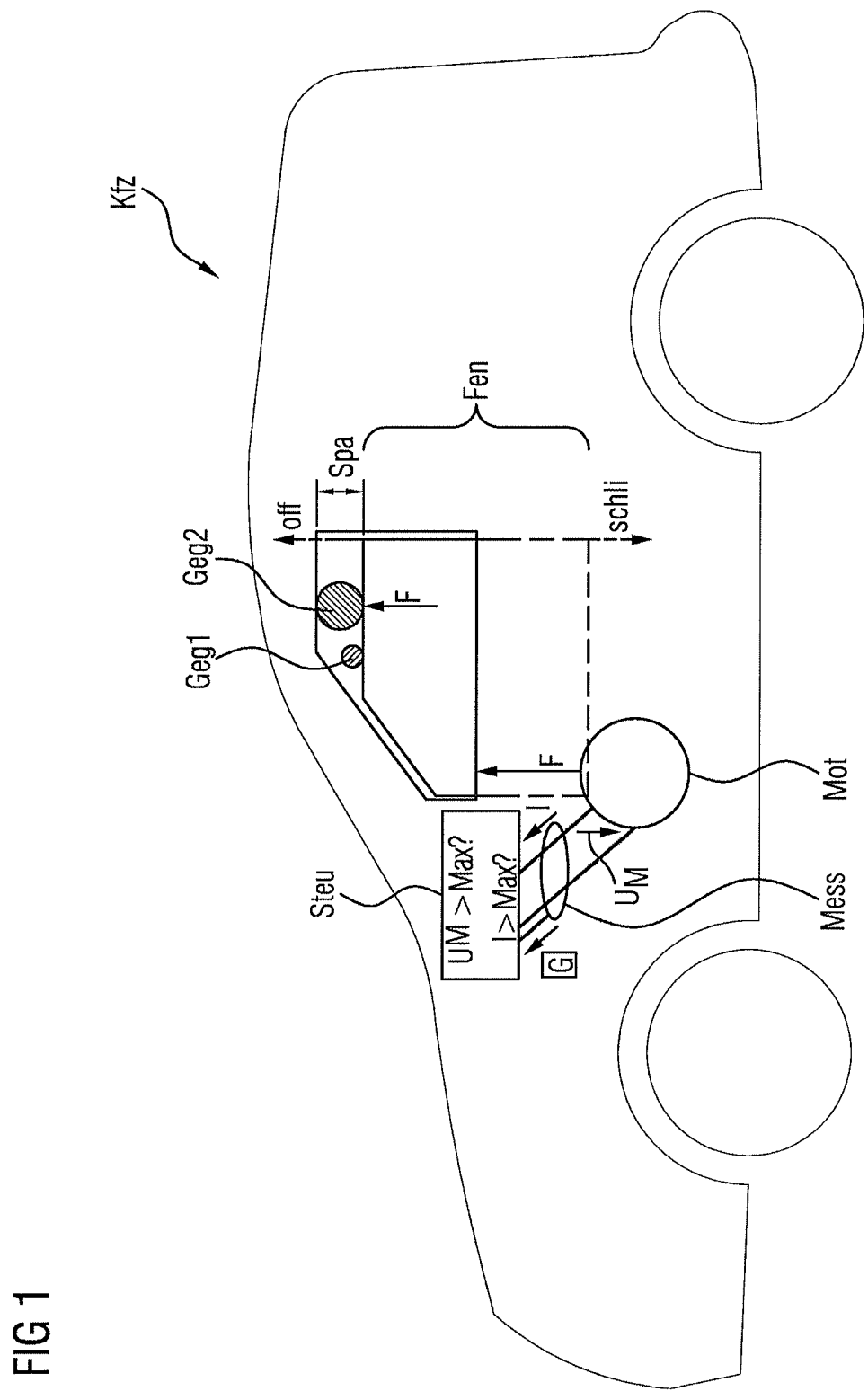
FIG. 1 shows a motor vehicle having a closing part, the movement of which is, for example, delayed, stopped or inverted by way of an actuation system of a motor in the case of detected jamming due to a body in the opening above the closing part.

FIG. 1 shows, by way of example and roughly in a simplified manner, a motor vehicle Kfz having a movable (off, schli) closing part Fen (in the form of a window here) as a refinement of the invention.

Jamming of the closing part Fen (for example by an object (subsequently also called body) Geg1 or Geg2, such as, for example, a sausage or a hand in the free gap Spa above the closing part Fen) is detected by way of an actuation system Steu of a motor Mot, in particular when the motor is stationary, by means of (for example the average value and/or maximum and/or profile etc. of) a variable G (for example a voltage $U_M$ at the motor Mot) measured by way of a measurement device Mess, whereupon, for example, the direction of movement (schlie) of the closing part Fen could be delayed, stopped or inverted (off).

In FIG. 1, with respect to the closing part Fen, the presence of jamming (=a so-called case of jamming with a force F) by way of, for example, an object Geg2 is determined because said object has no play to the top in the opening (in the form of a gap here) Spa, that is to say there is jamming.

In FIG. 1, with respect to the closing part Fen, depending on the refinement of the determination (comparison device Steu), either (already carefully) jamming or no jamming by the object Geg1, which still has play to the top in the opening, is determined.

Determination of the external force when the closing part Fen is (at least virtually) stationary is currently not used in the at least internally known prior art. Current, at least internally known force limitation/torque limitation/jamming protection systems make a reversing decision during operation, that is to say before the closing part Fen is stationary. Due to this premature decision, some of the robustness with respect to faulty reversal could be lost, since the tripping threshold would be adjusted based on the closing speed or the gradient of the speed. If the movable closing part Fen is successively braked to a stationary state, the robustness can advantageously be increased.

Exemplary embodiments of the invention describe alternative methods for determining the external force (on a motor Mot) by a resting object Geg1 or Geg2.

According to one refinement of the invention, in particular, a FET full-bridge having transistors T1, T2, T3, T4 is possible as the motor actuation system Steu (but it would also be possible to use a relay actuation system, for example).

During the normal operating procedure, the motor Mot is actuated, for example, by means of the control system Steu using, for example, FETs T1-T4 in the desired direction of movement off/schli and is short-circuited at the end of the movement (for example when the window is closed etc.) for an improved braking action.

One idea of a refinement of the invention is to carry out force identification (for example clamping force identification) when the motor Mot is (virtually stationary, for example with less than 0.1% or 1% of its maximum speed upon closing, or) stationary.

This can be carried out using the following procedure:
the system should initially (in FIG. 3: t31, in FIG. 4: t41) be located, for example, in a tensioned and/or stationary state (of the motor Mot). A low voltage $U_M$ (for example <0.1% or 1% or <5% etc. of the usual voltage used when closing (schli) the window Fen) is then temporarily applied to the motor Mot. The voltage $U_M$ is adjusted (for example once empirically) so that the motor Mot presses against the closing part Fen, but, for example, not yet in a strong enough manner to cause the closing part Fen to move (schli, off).

Figure 2:
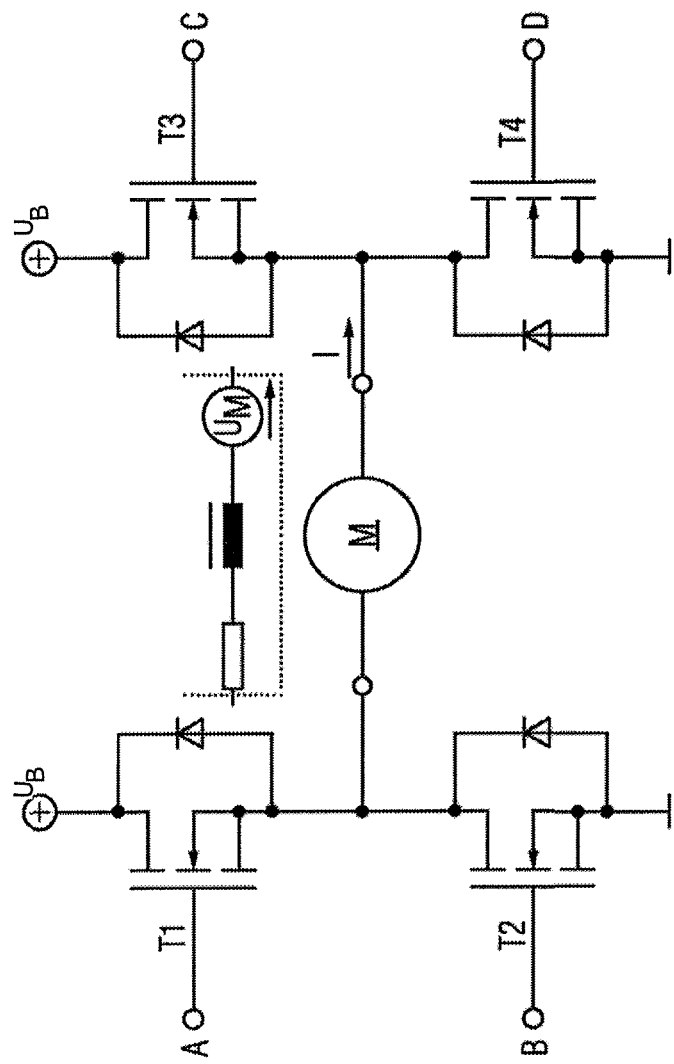
FIG. 2 shows an actuation system having a full-bridge (as per, for example, de.wikipedia.org/wiki/Vierquadrantensteller)

A relaxing operation and/or freewheeling then takes place (after the temporary application of the low voltage): for example, all of the, for example, four field-effect transistors FET (T1, T2, T3, T4) shown in FIG. 2 are switched for a short time (in particular approximately in the range of 5-20 ms) to high impedance (for example with respect to $U_B$ and M, or with respect to M and ground) by means of their control inputs A, B, C, D. As a result, the motor Mot is in freewheel and the closing part Fen (and/or the object Geg2) can relax (for example, in particular, elastically owing to a slight return movement of the motor counter to the closing direction schli).

To this end, the motor movement equation is:

$$J \, d\omega/dt = M_A - M_L$$

wherein J is the mass moment of inertia, ML is the load torque and MA is the armature torque (which results from the Lorentz force as follows: $M_L = c_{2\Phi} I_A$).

The current $I_A$ is, for example, zero in accordance with an electrical decay process. This results in the equation $J \, d\omega/dt = M_L$. The load torque ML can then be inferred from the profile of the angular velocity $\omega$.

The electrical motor equation $U_M = c_{2\Phi} \omega$ in this motor state shows that the motor voltage $U_M$ is proportional to the angular velocity $\omega$ of the motor Mot. The motor voltage $U_M$ can be measured and evaluated.

When the closing part Fen is loaded by an external force (case of clamping, for example by an object Geg1 or Geg2), the profile of the voltage $U_M$ during the relaxing process is, for example, steeper and the maximum value is, for example, higher than in the case of low loading. For example, the voltage (or the current) can be averaged over a period (for example of 20 ms) and the averaged voltage can be used as the correlated variable with respect to the external force. If the averaged voltage (or the averaged current) reaches a, for example empirically determined, threshold value, which is dependent on the system (mechanics, drive, motor), a case of jamming is identified.

A further option provides clocking between the short-circuited motor Mot and high impedance. It is possible to use a determined, previously set duty cycle and to ascertain whether a return to this operating state takes place or not.

Some possible advantages:
by estimating the closing force and/or angular velocity $\omega$ when the motor Mot is stationary, essentially the following advantages can be produced, in particular, when used in jamming protection methods:
lower clamping forces, especially when the motor starts
higher robustness with respect to "faulty" clamping identification (faulty reversal), since, for example, the speed-dependent offset of the tripping threshold can be raised to the maximum.

Instead of by means of the voltage, the movement and/or angular velocity of the motor could also be measured, for example, by way of an angle encoder and/or Hall sensor, or a current I through the motor could also be measured.

Also, without generating freewheeling, a voltage (back-emf) that is low (that is to say, for example, lower than that required/used for the opening/closing/adjusting movement of the part) can be applied (for example 1 V) and/or a current I through the motor Mot could also be used as measurement variable (which can also represent the voltage, for example) and/or additionally the monitoring duration could be shortened (for example T<20 ms).

Figure 3:
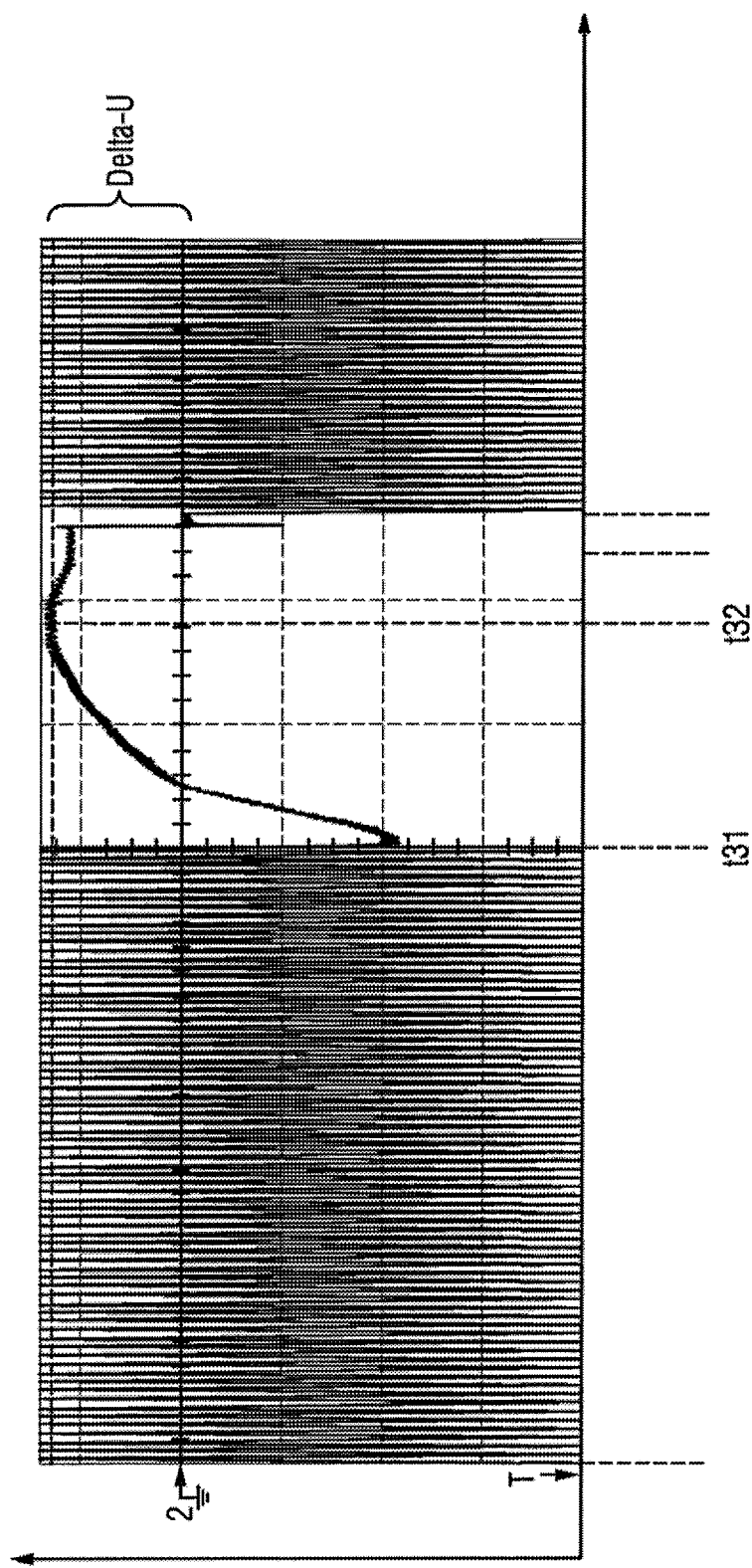
FIG. 3 shows a measurement in a case not jammed by a body.

FIG. 3 (wherein, for example, the window Fen is partly open) does not show a case of jamming by an object, wherein the case of non-clamping is detected by measurement of the motor voltage $U_M$ (as measured variable G):
for example, up to the time t31, the motor Mot is operated by way of pulse width modulation PWM, for example by way of a supply voltage of 12 V and a duty cycle of 24%; the motor Mot is located here in a stationary state (blocked). The motor Mot is then operated at high impedance.

The relaxing process can be observed by the motor voltage measurement (for example measurement of a generator voltage $U_M$ as variable G to be measured). In this case, without the case of jamming, the maximum generator voltage is Delta-U=706.25 mV after t32=18.4 ms.

Figure 4:
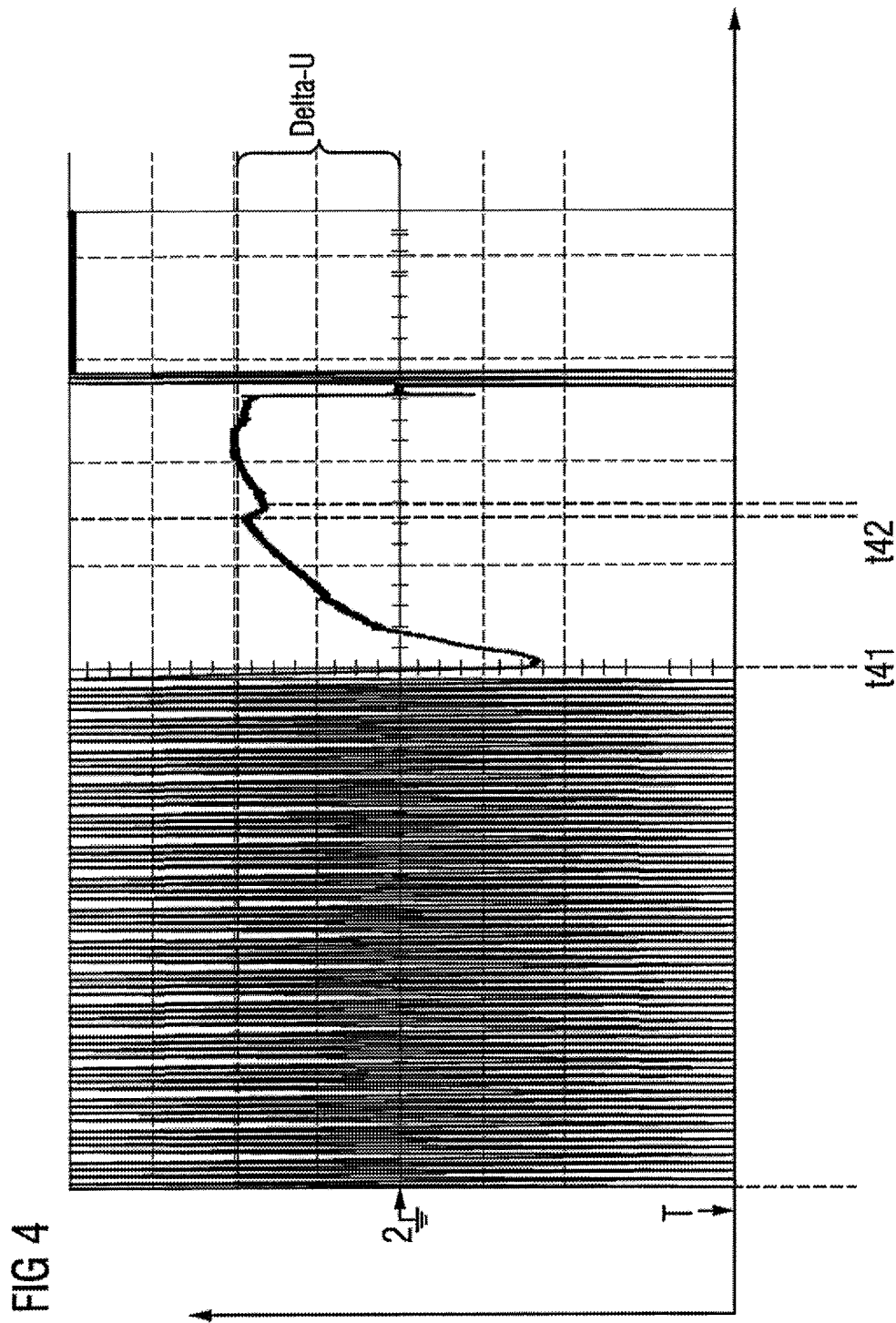
FIG. 4 shows a measurement in a case jammed by an object.

FIG. 4 shows the detection of jamming (by a jammed object Geg1 or Geg2), by way of measurement of the motor voltage measurement (as measured variable G):
up to the time t41, the motor Mot is operated and/or driven, for example, by way of PWM (for example by way of a supply voltage of 12 V and a duty cycle of 24%). The motor Mot is located here in a stationary state (blocked).

The motor Mot is then operated at high impedance from t41, for example. A relaxing process can be observed by a motor voltage measurement (for example of a generator voltage $U_M$ as variable G to be measured).

The maximum generator voltage $U_M$ (from the motor Mot) in a case of jamming is in this case, for example, Delta-U=981.25 mV after t42=14.5 ms.

Figure 5:
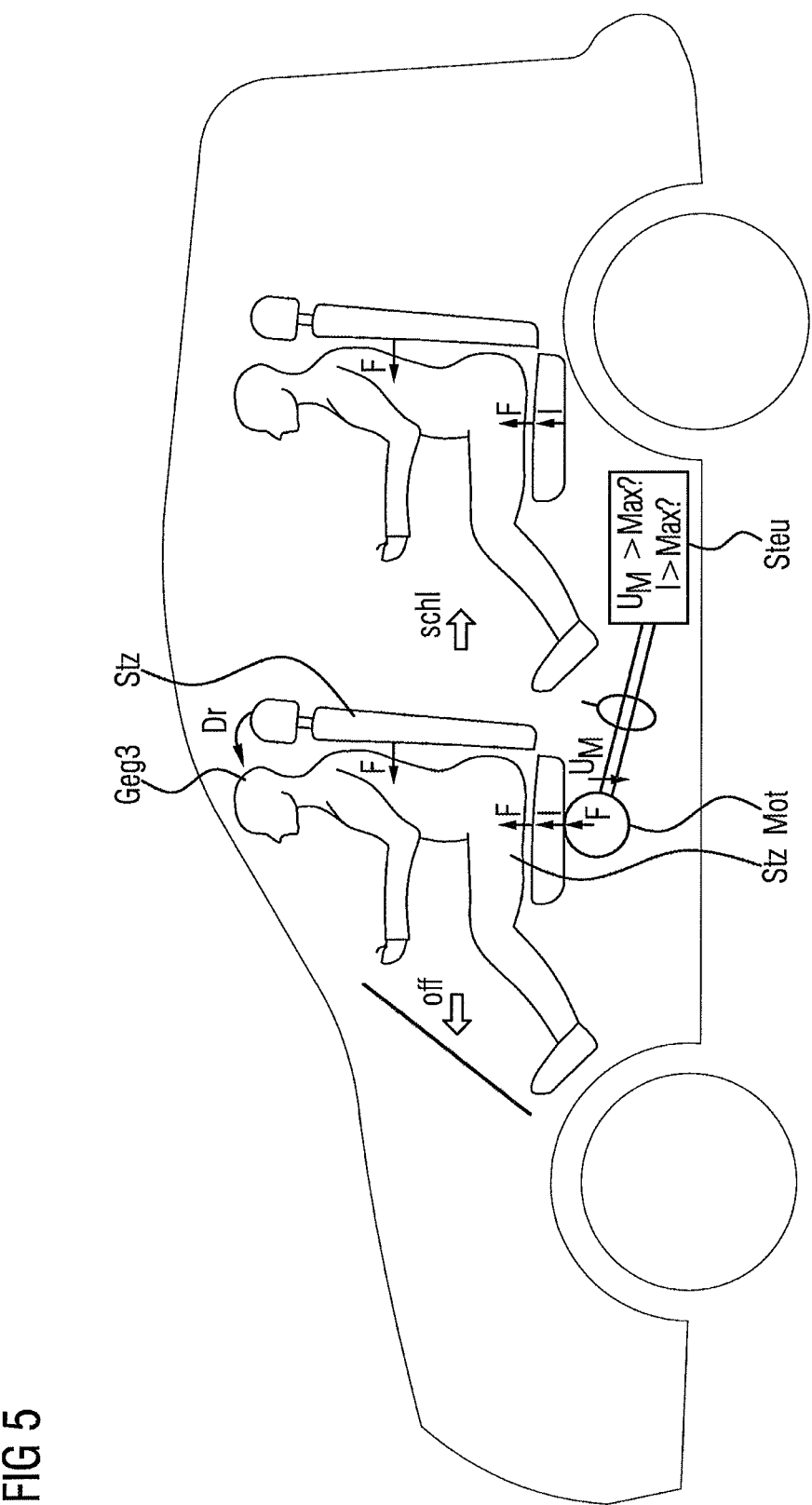
FIG. 5 shows a motor vehicle having a part in the form of a seat that can be moved by a motor, the force of which seat on a body being identified based on a measured/estimated/determined variable.

FIG. 5 shows a motor vehicle Kfz having a part in the form of a seat Stz that can be moved (for example forward (off) and/or backward (schl)) by a motor Mot, the force F and/or torque Dr of which (Stz) on a body Geg3 is identified based on a measured/estimated/determined variable (such as, for example, the voltage $U_M$ at the motor and/or the current I through the motor Mot and/or an angle encoder measurement at the motor Mot).

The force F is identified, for example, while a voltage $U_M$ is applied to the motor Mot when the motor Mot is, for example, stationary or virtually stationary, which voltage $U_M$ is, for example, lower than a prescribed limit value and/or which voltage is intended to effect a force F of the part Stz lower than a prescribed limit value on the body Geg3 and/or is low enough to not yet trigger any (significant) movement of the body Geg3, and/or which voltage $U_M$ is oriented so that, if it were greater, it would effect a movement in a direction opposite to the last movement of the object Geg3.

Based, for example, on a measured voltage $U_M$ at the motor Mot and/or a current I through the motor Mot and/or an angle encoder value, for example, the magnitude of a force F of the part Stz on a body Geg3 (and/or a torque Dr in the motor) can be identified and, for example, compared with a limit value Max (and, upon exceedance of a limit value Max, the motor Mot can be reversed where necessary, for example).

An exerted force F or an exerted torque Dr can generally be identified by a part on a body, for example, in such a way that it is identified whether a measurable force F or an exerted torque is exerted and/or whether a force F or an exerted torque Dr lower than, for example, a stored limit value Max is exerted.

The invention claimed is:

1. An apparatus for identifying a force exerted by a seat or closing part, selected from the group consisting of a window winding system, a sunroof, a trunk lid, and a sliding door of a motor vehicle, that can be electrically adjusted by way of an electric motor on a body resting on said seat or closing part, the apparatus comprising:
an actuation system, which is configured to apply a voltage to the motor, which voltage causes the force of the part on the body, if present, resting on said seat or closing part,
a measurement device which is configured, while the motor is stationary, to measure a variable of the motor representing a movement of the motor, and
a comparison device, which is configured to identify, based on the measured variable, the force exerted by the seat or closing part on the body resting on said seat or closing part,
wherein the actuation system is configured so that after a low back-emf is generated by the motor, a current flowing through the motor is measured.

2. The apparatus as claimed in claim 1, wherein the actuation system is configured to determine whether the force above a maximum and/or jamming of the body by the seat or closing part in the form of a closing part is present.

3. The apparatus as claimed in claim 1, wherein the actuation system is configured to identify the force that the seat or closing part in the form of a seat exerts on a body.

4. The apparatus as claimed in claim 1, wherein the actuation system is configured to determine whether the force that the seat or closing part in the form of a seat exerts on the body exceeds a maximum, to ascertain the presence of a body on the seat and/or to reduce the force and/or to adjust or to stop a movement of the seat.

5. The apparatus as claimed in claim 1, wherein the variable representing the movement of the motor is at least one of a voltage applied to the motor, a current flowing through the motor, or a variable measured at the motor by way of an angle encoder.

6. The apparatus as claimed in claim 1, wherein the variable representing the movement of the motor is a variable representing the angular velocity of the motor.

7. The apparatus as claimed in claim 1, wherein the measurement device is configured so that, during freewheeling, a variable representing the movement or angular velocity of the motor in the form of the voltage applied to the motor is measured, wherein, based on the measured voltage applied to the motor, it is determined how great the force exerted on a body resting on the seat or closing part is whether jamming is present.

8. The apparatus as claimed in claim 1, wherein the measurement device is configured so that, during freewheeling, a variable representing a movement of the motor is measured multiple times.

9. The apparatus as claimed in claim 1, wherein the comparison device is configured so that, based on the gradient of the time profile of the measured variable, and/or based on the exceedance of a maximum value by the measured variable, and/or based on an average value of the measured variable in a prescribed time interval, it is determined how great the force exerted on a body resting on the seat or closing part is whether jamming is present.

10. The apparatus as claimed in claim 1, wherein the comparison device is configured so that, based on the gradient of the time profile of the measured variable, and/or based on the exceedance of a maximum value by the measured variable, and/or based on an average value of the measured variable in a prescribed time interval, it is determined whether the force exerted on a body resting on the seat or closing part is greater than a maximum.

11. The apparatus as claimed in claim 1, wherein the actuation system is configured so that the motor is switched to freewheeling, and/or the motor is switched to a high-impedance state in order to switch it to freewheeling.

12. The apparatus as claimed in claim 1, wherein the actuation system has a full-bridge composed of electronically actuatable switching elements composed of field-effect transistors.

13. The apparatus as claimed in claim 1, wherein the actuation system uses a pulse-width-modulation device configured to switch the motor (Mot) switched thereby to freewheeling.

14. The apparatus as claimed in claim 1, wherein the actuation system is configured so that the motor is switched to freewheeling when the speed of the closing part is below a speed threshold value.

15. The apparatus as claimed in claim 1, wherein the actuation system is configured, in the case of jamming identified with the aid of the comparison device, to prevent further closure of the closing part by the motor and/or to displace the closing part to a more open position by the motor, and/or to output a signal representing the jamming.

16. The apparatus as claimed in claim 1, which is configured to identify a movement of the motor, which movement is produced by way of a relaxation of the seat or closing part, after the force has been effected on the seat or closing part by way of a low voltage relative to the voltage necessary for a movement of the seat or closing part applied to the motor.

17. An apparatus for identifying a force exerted by a seat or closing part, selected from the group consisting of a window winding system, a sunroof, a trunk lid, and a sliding door of a motor vehicle, that can be electrically adjusted by way of an electric motor on a body resting on said seat or closing part, the apparatus comprising:

an actuation system, which is configured to apply a voltage to the motor, which voltage causes the force of the part on the body, if present, resting on said seat or closing part, a measurement device which is configured, while the motor is stationary, to measure a variable of the motor representing a movement of the motor, and a comparison device, which is configured to identify, based on the measured variable, the force exerted by the seat or closing part on the body resting on said seat or closing part, wherein the actuation system is configured so that a voltage whose magnitude is below a prescribed motor voltage threshold value that would be necessary in order to cause the closing part to move and/or that effects the force lower than a maximum on the body, before a variable representing the movement of the motor is measured by way of the measurement device while the motor is freewheeling.

18. An apparatus for identifying a force exerted by a seat or closing part, selected from the group consisting of a window winding system, a sunroof, a trunk lid, and a sliding door of a motor vehicle, that can be electrically adjusted by way of an electric motor on a body resting on said seat or closing part, the apparatus comprising:

an actuation system, which is configured to apply a voltage to the motor, which voltage causes the force of the part on the body, if present, resting on said seat or closing part, a measurement device which is configured, while the motor is stationary, to measure a variable of the motor representing a movement of the motor, and a comparison device, which is configured to identify, based on the measured variable, the force exerted by the seat or closing part on the body resting on said seat or closing part, wherein the measurement device is configured so that, during freewheeling, a variable representing the movement of the motor in the form of a current flowing through the motor is measured or is ascertained from another variable, wherein, based on the current, it is determined how great the force exerted on a body resting on the seat or closing part is whether jamming is present.

* * * * *